United States Patent
Lineman et al.

(10) Patent No.: US 8,087,262 B2
(45) Date of Patent: Jan. 3, 2012

(54) PLATINUM CONDENSATION ABATEMENT BY ELECTROSTATIC PRECIPITATION

(75) Inventors: David Myron Lineman, Painted Post, NY (US); Matthew Carl Morse, Campbell, NY (US); Steven Robert Moshier, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 202 days.

(21) Appl. No.: 12/313,200

(22) Filed: Nov. 18, 2008

(65) Prior Publication Data

US 2010/0122555 A1    May 20, 2010

(51) Int. Cl.
C03B 5/00 (2006.01)
C03B 5/237 (2006.01)
C03B 5/18 (2006.01)
C03B 3/02 (2006.01)

(52) U.S. Cl. .............. 65/134.1; 131/134.6; 131/135.2; 131/135.3; 131/27

(58) Field of Classification Search .......... 65/134.9, 65/135.7, 27, 134.1, 134.6, 135.2, 135.3
See application file for complete search history.

(56) References Cited

U.S. PATENT DOCUMENTS

| 3,837,828 A | 9/1974 | Dietz et al. ............... 65/32 |
| 3,871,853 A | 3/1975 | Dietz et al. ............... 65/32 |
| 4,065,280 A | 12/1977 | Kao et al. ................. 65/3 |
| 5,964,913 A * | 10/1999 | Titov et al. .............. 65/135.6 |
| 6,629,437 B1 * | 10/2003 | Baucke et al. ............ 65/134.9 |
| 7,019,244 B2 | 3/2006 | Weaver et al. ............. 209/127.1 |
| 7,021,082 B2 * | 4/2006 | Hoyer et al. .............. 65/134.9 |
| 2006/0150677 A1 * | 7/2006 | Kobayashi ................. 65/27 |
| 2008/0041109 A1 * | 2/2008 | Burdette et al. ........... 65/135.2 |

FOREIGN PATENT DOCUMENTS

| JP | 2007-063097 | 3/2007 |
| JP | 2007-077004 | 3/2007 |
| WO | WO 2006/026787 | 3/2006 |

OTHER PUBLICATIONS

R.C. Jewell, "Platinum in the Glass Industry: Investigating Contamination with the Electron Probe Scanning Microanalyser", Platinum Metals Review, 1964, retrieved from the Internet on Jun. 14, 2010.*
Ginther, R.J., *The Contamination Of Glass By Platinum*, Journal Of Non-Crystalline Solids 6, 294-306 (1971).
Campbell, J. H. et al. *Elimination of Platinum Inclusions in Phosphate Laser Glasses*, Lawrence Livermore National Laboratory, 1-62 (1989).
Lowe, H. J., *The Physics of Electrostatic Precipitation*, British Journal of Applied Physics, S40-S47.
Dayley et al., *Electrical Engineering for Pollution Control*, Electrical Engineering ASU, 1-2 (2003).
Turner, et al, *Electrostatic Precipitators*, Research Triangle Institute, et al., 6-1-6-31 (1995).

* cited by examiner

*Primary Examiner* — Richard Crispino
*Assistant Examiner* — Dionne Walls Mayes
(74) *Attorney, Agent, or Firm* — Siwen Chen (57) ABSTRACT

A process and device for abating air-borne particles during glass melt handling processes by using electrostatic precipitation. The invention is effective in abating both precious metal inclusions and non-metallic inclusions in the produced glass.

8 Claims, 5 Drawing Sheets

PLATINUM CONDENSATION ABATEMENT BY ELECTROSTATIC PRECIPITATION

TECHNICAL FIELD

The present invention relates to processes and apparatuses for abating particles during the handling of glass melt. In particular, the present invention relates to processes and apparatuses for making glass using a platinum-containing metal delivery system where platinum oxidation and subsequent reduction can cause platinum defects in glass. The present invention is useful, e.g., in the manufacture of high-quality glass (such as glass suitable for making a glass substrate of a LCD display) using a glass melt delivery system comprising platinum.

BACKGROUND

The high optical quality imposed by LCD applications desires no large inclusions in the LCD glass substrate. It is known that precious metal inclusions are an issue where the glass melt is delivered, fined or formed using precious metal-containing equipment. As quality and surface requirements get more stringent, the size and quantity of allowable precious metal inclusions continue to decrease. The issue of precious metal inclusions in glass is not a new issue and is not unique to display glasses.

One postulated mechanism for the occurrence of precious metal inclusions in glass is the oxidation and subsequent dissociation and condensation of the precious metal at elevated temperatures. If these oxidation-condensation reactions occur in areas near free glass surfaces, the condensed metal can be incorporated in the glass and form a defect/inclusion. It was previously suggested that precious metal inclusions can be reduced by immersing the precious metal in an inert atmosphere, thus avoiding the oxidation and subsequent condensation of metal.

However, the introduction of an inert gas into the glass handling system is not easily done; it involves extra equipment that can be difficult to retrofit into existing glass production lines. Moreover, the inert gas atmosphere can be maintained only through a continuous flow of such protective gas, which can cause an undesired change of the thermal profile of the glass production line. Still further, even though this approach may be effective in reducing precious metal inclusions, it may not reduce contamination by other non-metal sources, such as $SnO_2$, and the like.

Thus, there remains a need for a process and equipment which can effectively and efficiently abate the particles that can impact the quality of the glass in a glass-handling process. The present invention satisfies this need.

SUMMARY

According to a first aspect of the present invention, a process is provided for making glass comprising:

(A) handling the glass melt in a refractory vessel, wherein the glass melt is exposed to an atmosphere comprising an air-borne particle; and (B) abating the particle by applying an electric field in the atmosphere, collecting the particle on the surface of at least one electrode generating the electric field, wherein the electric field essentially does not provide an electrical potential gradient in the glass melt.

According to certain embodiments of the first aspect of the present invention, the refractory vessel comprises a refractory metal exposed to the atmosphere, and the atmosphere is oxidative such that the reaction between the refractory metal and the atmosphere produces at least part of the air-borne particle.

According to certain embodiments of the first aspect of the present invention, the refractory metal vessel comprises platinum or an alloy thereof.

According to certain embodiments of the first aspect of the present invention, the electric field generates a corona in the atmosphere.

According to certain embodiments of the first aspect of the present invention, all metal in direct contact with the glass melt is subjected to essentially the same electrical potential.

According to certain embodiments of the first aspect of the present invention, in step (A), the refractory vessel comprises a glass melt stirring device comprising (a) a stir chamber defined by a chamber wall comprising a refractory metal and (b) a stirrer shaft comprising a refractory metal. In certain specific embodiments, in step (B), the electric field is at least partly generated by an electrical potential gradient between (i) the stir chamber wall and the stirrer shaft, which together function as a first electrode; and (ii) an opposite second electrode placed above the surface of the glass melt.

According to certain embodiments of the first aspect of the present invention, in step (B), a barrier for receiving particle is provided between the second electrode and the surface of the glass melt.

According to certain embodiments of the first aspect of the present invention, in step (B), the electrical field between the first electrode and the second electrode is effected by an electric potential gradient of at least 100V.

According to certain embodiments of the first aspect of the present invention, in step (B), the second electrode is provided with a higher electric potential than the first electrode.

According to certain embodiments of the first aspect of the present invention, in step (A), the glass melt is suitable for making a glass substrate for LCD displays.

According to certain embodiments of the first aspect of the present invention, at least part of the wall of the stir chamber and at least part of the stir shaft are exposed to an oxygen-containing atmosphere.

According to a second aspect of the present invention, provided is a glass melt handling device comprising a refractory vessel adapted for operating at an elevated temperature, wherein the glass melt is exposed to an atmosphere comprising an air-borne particle, comprising an electrostatic precipitator comprising: (i) a first electrode; and (ii) a second electrode for collecting the particle.

According to certain embodiments of the second aspect of the present invention, the refractory vessel comprises a refractory metal exposed to the atmosphere.

According to certain embodiments of the second aspect of the present invention, at least part of the refractory vessel functions as the first electrode of the electrostatic precipitator.

According to certain embodiments of the second aspect of the present invention, an identical electric potential is applied to the surface of refractory metal exposed to the glass melt.

According to certain embodiments of the second aspect of the present invention, the refractory vessel comprises a glass melt stirring device comprising a stir chamber and a stir shaft.

According to certain embodiments of the second aspect of the present invention, the devices comprises a barrier between the second electrode and the surface of the glass melt to be handled by the device during operation, wherein the barrier is adapted for intercepting particles falling off the second electrode.

According to certain embodiments of the second aspect of the present invention, the second electrode has a higher electric potential than the first electrode.

According to certain embodiments of the second aspect of the present invention, the device further comprises a third electrode having a differing electric potential from that of the first electrode. In certain specific embodiments, the third electrode has essentially the same electric potential as the second electrode. In certain more specific embodiments, the third electrode has an electric potential higher than that of the first electrode.

According to certain embodiments of the second aspect of the present invention, at least one electrode is capable of generating a corona.

According to certain embodiments of the second aspect of the present invention, the surface of the second electrode is a different material than the surface of the first electrode.

One or more embodiments of the present invention have one or more of the following advantages. First, the present invention can enable the reduction of platinum inclusions in glass materials delivered, fined, formed and/or stirred in platinum-containing refractory vessels, thereby improving the glass yield. Second, the present invention, while reducing platinum inclusion, also reduces the possibility of composition and property variation that may be caused by the contamination by other inorganic air-borne particles such as $B_2O_3$, $SnO_2$, and the like.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "an electrode" includes embodiments having two or more electrodes, unless the context clearly indicates otherwise. Likewise, reference to "a particle" includes embodiments having two or more particles, simultaneously or intermittently.

As used herein, "glass melt handling device" means a device for processing a glass melt, including but not limited to: a glass melt delivery device, a glass melt homogenizing device such as a stirring device, a glass melt forming device such as a glass melt rolling device, a glass melt pressing device, a fusion draw system which forms glass sheet from glass melt, a slot draw system which forms glass sheet from glass melt, and the like. Since glass melt is typically held at an elevated temperature, a glass melt handling device typically comprises a refractory vessel, including but not limited to a pipe, a container, a chamber, a block, and the like, directly in contact with the glass melt. Thus, the term "handling of glass" as used herein can include, inter alia, glass melt delivery, glass melt homogenization (such as stirring and mixing), glass melt fining, glass forming (rolling, pressing, fusion forming, slot forming, drawing), and the like. However, excluded from the meaning "glass melt handling" and "handling of glass melt" is the step of glass melting in which raw materials such as oxides, minerals, cullets, and the like, are heated and allowed to react to form the glass melt with a determined composition. The present invention is concerned with process steps after a glass melt is formed in a glass melting tank.

As used herein, "electrostatic precipitation" means the collection of air-borne particles by subjecting the particles to an electric field. The term "air-borne" means the particles may be present in the atmosphere, either transiently or stably. Thus such particles could include, inter alia, those particles that can suspend relatively stably in the atmosphere, as well as those particles that travel in the air temporarily (falling due to gravity, or entrained by air flow, e.g.). In certain embodiments, the electric field is generated by two electrodes. In certain embodiments, the electric field is generated by more than two electrodes. In certain embodiments, at least one of the electrodes, desirably an electrode having a higher electric potential, produces a corona that can provide electric charges to the air-borne particles. At least one of the electrodes serves as a particle collector on which the particles are collected via, e.g., a force exerted thereto by the electric field generated by the electrodes.

After a glass melt is formed in a glass tank, before the glass melt is allowed to cool down to a rigid glass article (such as a glass sheet, a glass plate, and the like), the glass melt is typically subjected to various handling steps mentioned above. During those steps, the glass melt may be exposed to an atmosphere. The atmosphere may comprise air-borne particles due to various reasons. Such particles, if allowed to fall into the glass melt, can form unwanted inclusions in the final formed glass article, reducing the quality and yield. Abatement of such particles in the atmosphere is thus necessary, especially for optical glass articles. Contaminating particles can be generated by a number of factors, including, inter alia, air supply devices, evaporation and condensation of glass melt and/or components thereof, evaporation, reaction and condensation of refractory materials used in the handling process, mechanical force exerted on the refractories, and the like.

LCD glass substrates are required of a high quality, both in terms of surface and bulk. The fusion draw technology was developed by Corning Incorporated, Corning, N.Y., U.S.A. for forming thin glass sheets having pristine optical surfaces suitable for forming semiconductor components such as thin-film-transistors thereon. The stringent requirements imposed on the optical quality of the bulk of the glass sheet also call for very low level of inclusions therein. In this technology, refractory materials, such as precious metals including Pt, Rh, Ir, Os, Pd, Au, Ru, Re and the like, may be employed, along with non-metallic refractories such as $SiO_2$, $ZrO_2$, zircon, $Al_2O_3$, SiC, and the like, in the equipment handling the glass melt. It is known that the following factors, inter alia, can contribute to the formation of unwanted inclusions in the glass sheet.

First, oxidation and subsequent reduction of precious metals such as Pt and Rh contribute to forming precious metal defects in glass. For example, as the temperature of platinum rises, such as from room temperature to the typical temperature at which LCD glass melt is handled, the equilibrium of the following reaction is favored to shift to the right:

$$Pt\ (solid) + O_2\ (gas) \leftrightharpoons PtO_2\ (gas).$$

Thus the hot surface of a Pt vessel can be oxidized into $PtO_2$ gas in the presence of $O_2$ in the ambient atmosphere, which, upon contacting another surface or medium (such as the atmosphere) at a lower temperature, may dissociate to form solid Pt. The solid Pt can grow over time into particles sufficiently large, subsequently fall into the glass melt, and form inclusions in the final glass article formed.

Second, the evaporation of certain glass components and subsequent condensation thereof upon contacting a surface or a medium with a lower temperature, such as $B_2O_3$, $SnO_2$, $R_2O$ (R being alkali metals), and the like, can cause the formation of particles of these oxides. If these oxide particles fall into the glass melt, they can alter the composition of the glass locally, causing undesired composition and property variation in the final glass.

Third, other refractory materials used in constructing the refractory vessels may chip or otherwise produce fine particles. Given the refractory nature of these particles, they can form blisters and other inclusions in the final glass article.

Fourth, the ambient air that comes into contact with the glass melt may be contaminated by particles such as dust generated by other equipment or process steps. For example, the downstream process such as glass scoring, breaking, edge finishing, and the like, may produce glass particles that find their way into the atmosphere which the glass melt may contact. This is especially true in the glass forming area, where the glass melt is formed in an atmosphere with considerable air flow from the down-stream process.

Therefore, there is a genuine need of particle abatement in the glass-making process, such that particles are captured before they contact the glass melt. Such need is especially pronounced in areas where precious metal is exposed to oxygen at an elevated temperature, due to the mechanism explained above. These areas can include, but are not limited to: (i) the glass melt fining device; (ii) the downcomer area; (iii) isopipe area; (iv) the glass stirring device, and (v) the glass forming device.

In a glass melt fining device made of precious metal, the glass melt is allowed to fill partly in the finer vessel, which can be a tube. The inner surface of the finer above the glass line is thus exposed to an atmosphere which can be oxygen-containing. Bubbles inside the glass melt are allowed to exit the glass melt and escape the glass finer. Due to the above mechanism, Pt particles may be formed on the inner surface of the finer, or on the surface of the outlet for exhaust gas, accumulate overtime, and fall when it grows sufficiently large, into the glass melt to form Pt inclusions.

The downcomer is a pipe delivering glass melt into the inlet of the isopipe, where glass melt is formed into a glass sheet. The downcomer can be made of a Pt or Pt alloy. The glass melt is exposed to an oxygen-containing atmosphere when it exits the downcomer. The metal forming the downcomer can be oxidized according to the above mechanism to form Pt particles which could eventually make their way into the glass melt to form inclusion defects.

The isopipe is the device over which glass melt overflows, joins at the bottom, and fuses into a single glass sheet. Pt or Pt alloy, which can be used for building part of or supplementary components of the isopipe, is typically exposed to air and elevated temperature. According to the same mechanism, Pt particles can be produced and brought into the glass melt during forming. In this area, significant air flow can take place, increasing the probability of contamination by other particles as well.

Figure 1:
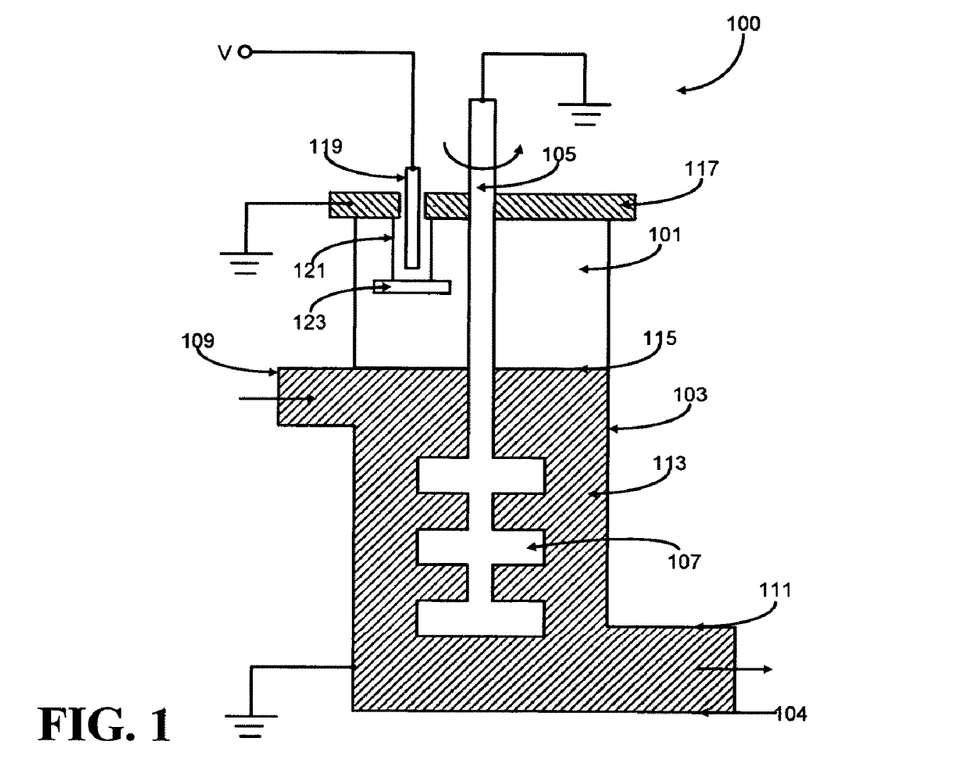
FIG. 1 is a schematic illustration of a stirring device according to one embodiment of the present invention.

The stirring device is a component of the glass melt handling system which is highly prone to Pt particle condensation and contamination. FIG. 1 includes a schematic illustration of a typical glass melt stirring device. In this device, a stir chamber is defined by a stir chamber wall 103 and a bottom 104. Glass melt 113 is delivered into the chamber through inlet 109 and fills the chamber up to glass line 115. Stirrer shaft 105 comprising a plurality of blades 107, stirs the glass melt 113 by the shearing stress it produces by rotation. Stirrer shaft 105 and the chamber wall 103 are made of Pt or Pt alloy in certain advantageous embodiments. The stir chamber may be further covered by stir chamber cover 117. Above the glass line 115, the stir chamber is filled with an oxygen-containing atmosphere, such as air, in certain embodiments. Typically, the glass melt has the highest temperature inside the chamber; and the temperature in the chamber cover area is lower than the glass melt. This temperature gradient, even if less than 10° C., can be sufficient to cause the oxidation and reduction/condensation of Pt and Pt alloy particles on contact with a surface or medium having a lower temperature. Without proper abatement, the particles accumulated over time can grow sufficiently large, fall into the glass melt, and eventually causes defects in the glass sheet formed.

The present invention uses an electric field to attract and capture air-borne particles, including metal particles, such as Pt and Pt-alloy particles, particles formed from glass components, and particles that exist in ambient air, thereby abating them and preventing them from entering into the glass melt.

The electric field is generated by at least two electrodes having differing electric potential. In a typical electrostatic precipitator used, e.g., in a power plant for the abatement of fly-ash, at least one electrode of the precipitator has the capability to provide a corona which provides the electrical charges to the particles, which is then attracted and collected by the opposite electrode. Once reaching the opposite electrode, the charges borne by the particles are neutralized by the opposite charges supplied by the opposite electrode. In these conventional electrostatic precipitators, the electrodes are routinely made of metal. In the present invention, the electrodes may be made of metal, and other materials, as long as the material has sufficient electrical conductivity at the operating temperature. As indicated supra, even though a corona is desirably formed by at least one electrode in certain embodiments of the present invention, the generation is corona is not necessary as indicated by the Example below. Without intending to be bound by a particular theory, the present inventors believe in certain embodiments, at least some of the particles formed or present in the atmosphere of the glass-handling device is already charged with various amounts of electrical charges, and thus can be attracted and captured by an opposite electrode.

The glass melt stirring device 100 schematically illustrated in FIG. 1 represents an embodiment of the present invention. In stirring device 100, in addition to the above components typical of a glass melt stirring device described and discussed above, an electric field is generated by applying a voltage between the chamber wall 103, the stir shaft 105, the stir chamber cover 117 (all three are grounded as illustrated) and a second electrode 119 inserted into the stir chamber. In this embodiment, the stir chamber wall 103, the stir shaft 105 and the stir chamber cover 117 collectively function as a first electrode in the meaning of the electrostatic precipitator in the present application. Between the second electrode 119 and the glass line (the surface of the glass melt exposed to the atmosphere), barrier 123 is attached to the end of rods 121 extending from stir chamber cover 117. Barrier 123 has the capability to intercept any particles, such as Pt particles, that may fall from the surface of the second electrode 119. Desirably, the extending rods 121, which hold barrier 123 in place, and the barrier 123, are made of electrically insulating materials, such as oxides, ceramics, and the like. Thus, by the effect of the electric field applied in the atmosphere, any air-borne particle is first attracted to the surface of the second electrode 119, collected on the surface of the second electrode 119, and further collected by the barrier 123 in case the particles fall from the surface of the second electrode 119. The second electrode 119 and barrier 123 may be cleaned from time to time, without significant interference with the continuous glass handling process.

In order to obtain a high-quality glass melt essentially free of bubbles or blisters, it is desired that the glass melt does not undergo a gas-evolving electrochemical process. It is known that when an electrical potential is applied to a glass melt, especially one comprising OH groups, electrolysis reactions may take place, leading to the formation of gas bubbles that may be trapped in the glass and included as defects in the final glass article to be produced. In the glass substrates for LCD displays, the level of blisters such as trapped gas bubbles are desired to be very low. Thus, in the present invention, care should be taken that the electrical field applied in the atmosphere in by the electrodes do not generate significant electrical potential gradient in the glass melt to cause such undesired side reactions. One approach to this end is to impose a substantially identical electrical potential to all metals in direct contact with the glass melt during operation thereof. For example, in the glass melt stirring device as illustrated in FIG. 1, the refractory metal wall 103 and the bottom 104 of the chamber, as well as the metal stir shaft are all grounded, effectively subjecting them to the same electrical potential in the system, thereby avoiding the application of an electrical potential gradient to the glass melt via these metals.

It is also contemplated that, in other embodiments of the glass melt stirring device according to the present invention, multiple electrodes may be utilized in the atmosphere to achieve an optimal particle collection efficiency and efficacy. In certain embodiments, it is desired that at least one of the electrodes is capable of generating a corona, which can facilitate the charging of the particles, thus further enhancing the efficiency and efficacy of particle collection.

The present invention is further illustrated by the following non-limiting examples.

EXAMPLE

Figure 2:
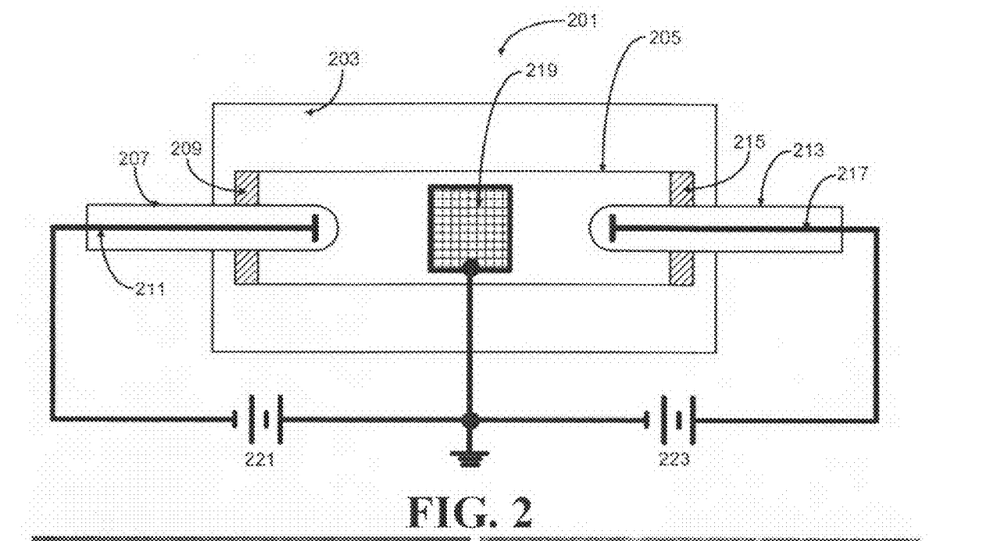
FIG. 2 is a schematic illustration of a laboratory set-up testing the efficacy of the present invention for platinum condensation abatement.

In this Example, the present inventor demonstrated the effectiveness of Pt particle abatement by utilizing an electrical field generated by electrodes in an atmosphere. FIG. 2 schematically illustrates the laboratory set-up. In set-up 201, inside furnace 203, an alumina tube 205 is inserted. Electrically grounded platinum mesh 219 was placed in the middle of alumina tube 205. On both sides of platinum mesh 219 inside alumina tube 205, negative electrode 211 and positive electrode 217 were inserted at locations essentially symmetrical relative to platinum mesh 219. In order to observe any platinum condensate collected by the electrodes, electrodes 211 and 217 were enclosed by alumina tubes 207 and 213, respectively. The tubes 207 and 213 were secured to the ends of alumina tube 205 by insulating fire bricks 209 and 215, respectively. Essentially identical DC voltages 221 and 223 were applied (i) between platinum mesh 219 and the negative electrode 211 and (ii) between positive electrode 217 and platinum mesh 219. Thus, during the test, an electric field is established in the atmosphere inside tube 205.

Figure 3:
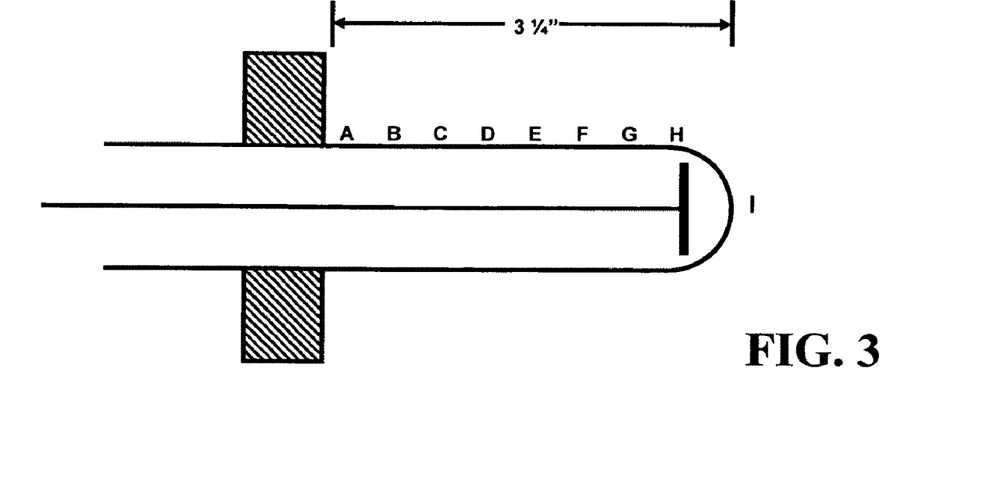
FIG. 3 is a schematic illustration of respective temperature zones of the tube enclosing the electrodes in the electrostatic precipitator illustrated in FIG. 2.
Figure 4:
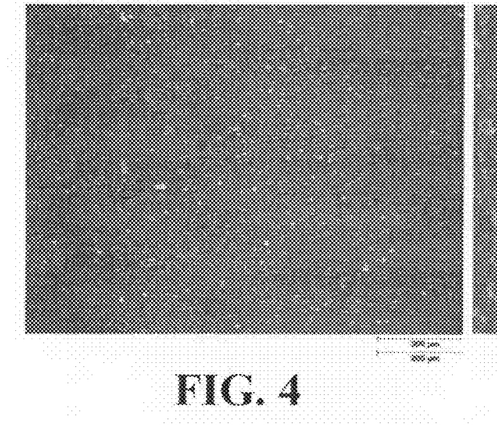
FIGS. 4-21 are electronic microscopic images of the different zones of the two electrodes of the electrostatic precipitator as illustrated in FIG. 2 at the end of the test.
Figure 5:
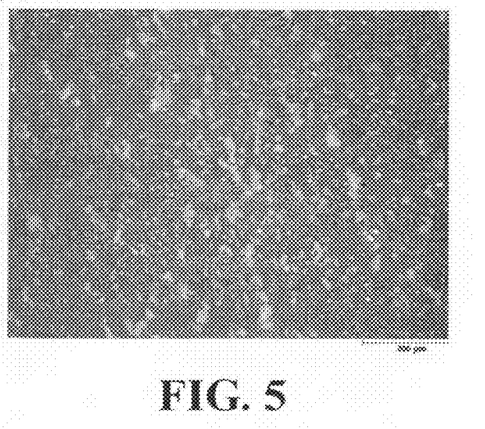
Figure 6:
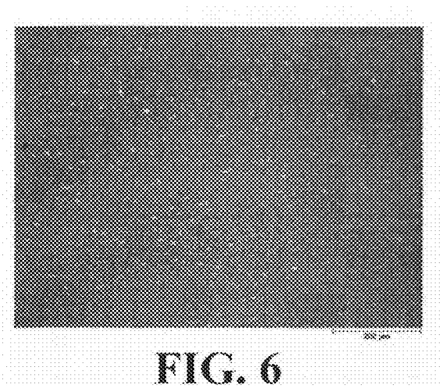
Figure 7:
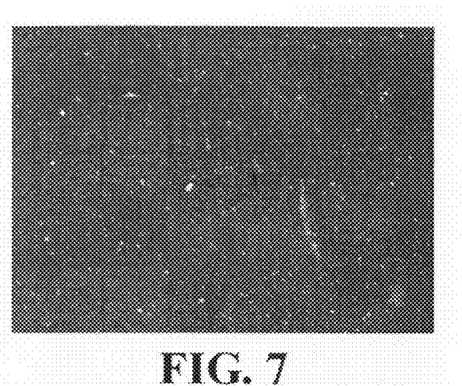
Figure 8:
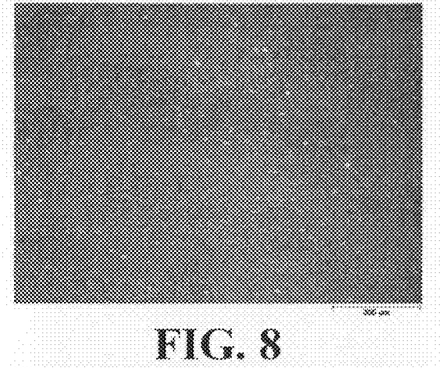
Figure 9:
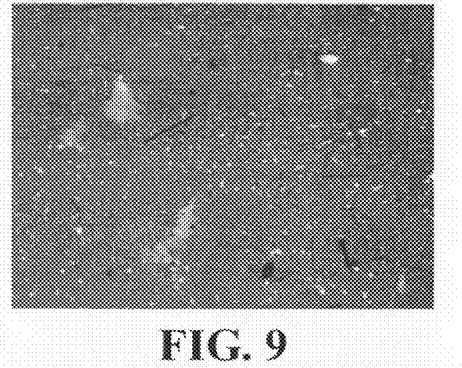
Figure 10:
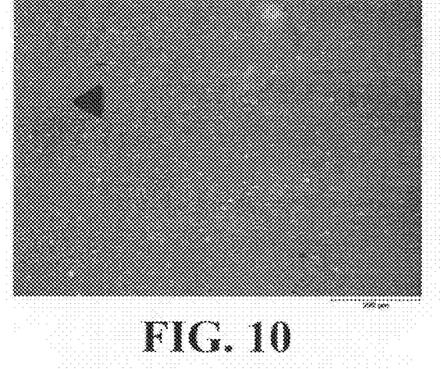
Figure 11:
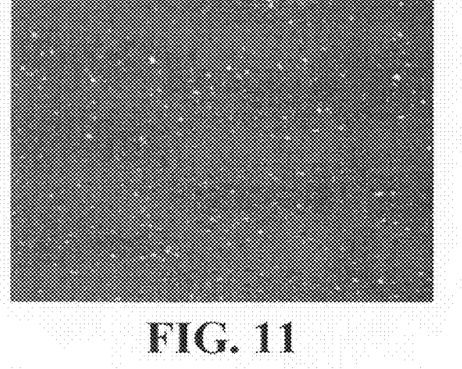
Figure 12:
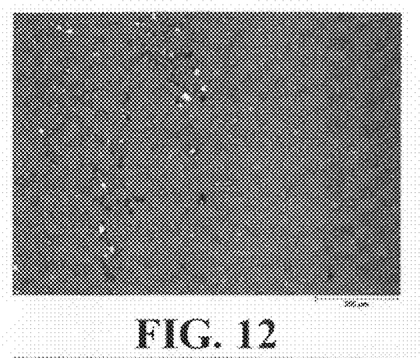
Figure 13:
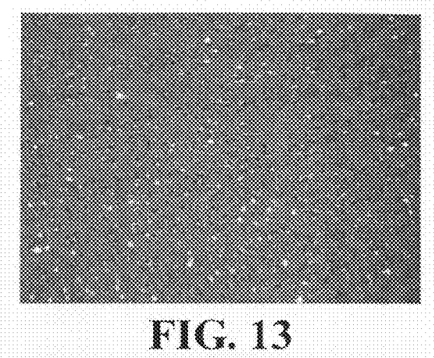
Figure 14:
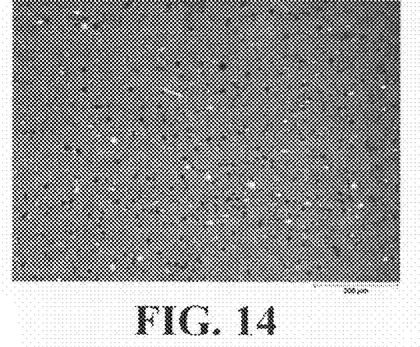
Figure 15:
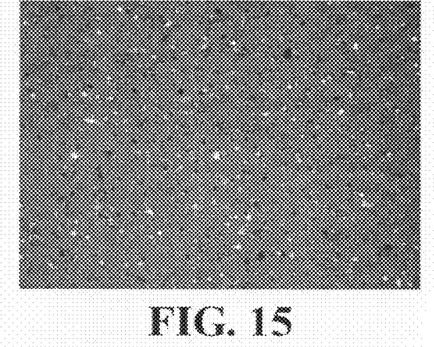
Figure 16:
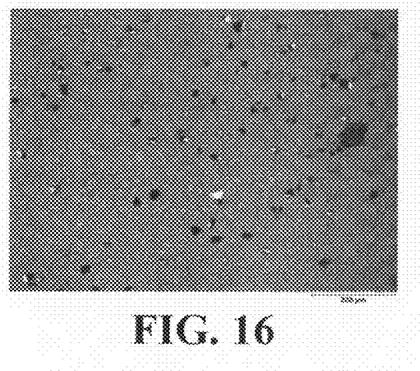
Figure 17:
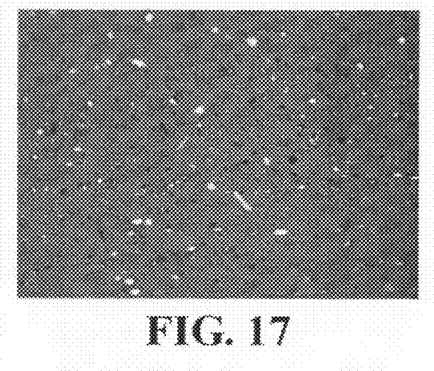
Figure 18:
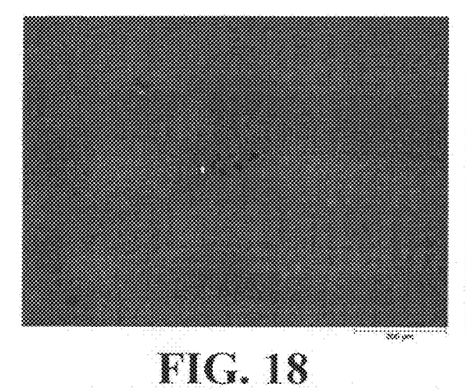
Figure 19:
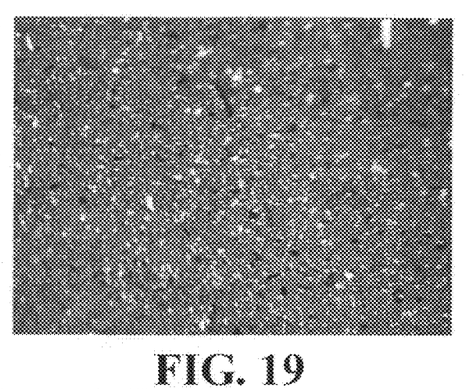
Figure 20:
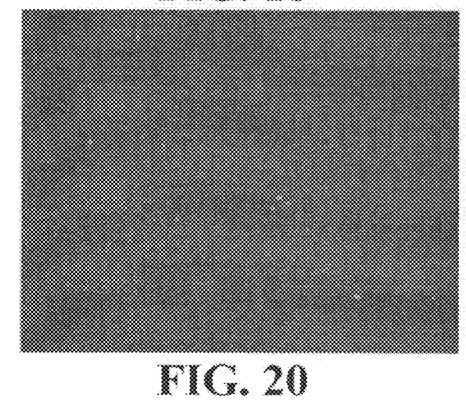
Figure 21:
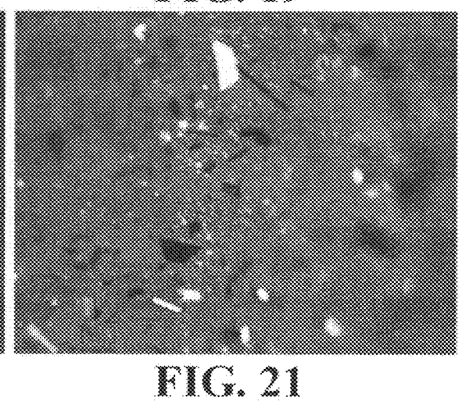

During the test, the temperature profile inside furnace 203 was held substantially constant. Thus, due to the nature of the set-up, a thermal gradient existed along tubes 207 and 213. The temperature of the various locations along tubes 207 and 213 were measured and recorded. FIG. 3 illustrates the locations measured on the electrode enclosure tubes 207 and 213 in greater detail. The temperature of the parts are included in the following TABLE I.

TABLE I

| | | Tube Location | | | | | | | | |
|---|---|---|---|---|---|---|---|---|---|---|
| | | A | B | C | D | E | F | G | H | I |
| Temperature (° C.) | 207 | 715 | 804 | 861 | 918 | 981 | 1056 | — | 1127 | — |
| | 213 | 745 | 817 | 873 | 928 | 1002 | 1075 | — | 1152 | — |

After running the experiment for 97 hours, the experiment was stopped. The surfaces of tubes 207 and 213 were observed under microscope. Images of the surfaces at locations A to I on the two enclosure tubes 207 and 213 are provided in the appended FIGS. 4-21. The correspondence between the figure numbers and the images are provided in TABLE II below.

TABLE II

| | | Tube Location | | | | | | | | |
|---|---|---|---|---|---|---|---|---|---|---|
| | | A | B | C | D | E | F | G | H | I |
| FIG. | 207 | 4 | 6 | 8 | 10 | 12 | 14 | 16 | 18 | 20 |
| | 213 | 5 | 7 | 9 | 11 | 13 | 15 | 17 | 19 | 21 |

As can be seen from the above tables, electrode enclosure tubes 207 and 213 have essentially the highest temperature in the tip areas, which is closest to platinum mesh 219, and the temperature decreases gradually from the tip to the end in contact with insulating fire bricks 209 and 215. The temperature of the platinum mesh 219 has a higher temperature than the tip zones of the two electrodes. Insulating fire bricks 209 and 215 are not air-tight. Thus, the atmosphere inside tube 205 contains air, and is supplied with additional $O_2$ when $O_2$ is consumed over time by the oxidation of Pt via convection and/or diffusion. Due to the temperature gradient between platinum mesh 219 and electrode enclosures 207 and 213, Pt was found to have migrated from the mesh to the electrode enclosures, presumably by the oxidation-condensation mechanism described above.

It was observed that on both the enclosures of the positive and negative electrodes of the electrostatic precipitator utilized in the FIG. 2 test, there was an appreciable amount of particle collection. Some of the particles are probably produced by inorganic materials, such as the alumina enclosures and the insulating fire brick used in constructing the laboratory equipment; others are metal particles produced by the gasification of platinum due to oxidation and subsequent condensation. Also, many more oxidation/reduction sourced platinum particles were found on the surface of positive electrode enclosure 213 (i.e., the electrode with a higher electrical potential). Therefore, it appears that the positive electrode is more capable of attracting, forming and collecting Pt particles.

From the above experiments, it is envisioned that the present invention can be used to abate both non-metallic particles (such as oxide, glass and ceramic particles) and metallic particles (such as Pt defects and the like), in a glass-handling device.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for making glass comprising:
   (A) handling a glass melt in a refractory vessel, wherein the glass melt is exposed to an atmosphere comprising an air-borne particle above the glass melt near the glass surface; and
   (B) abating the particle by applying an electric field in the atmosphere, and collecting the particles above the glass melt near the glass surface on the surface of at least one electrode generating the electric field, wherein the electric field does not provide an electrical potential gradient in the glass melt that would result in an electrolysis of the glass melt, wherein the refractory vessel comprises a refractory metal comprising platinum or an alloy thereof exposed to the atmosphere, and the atmosphere is oxidative such that the reaction between the refractory metal and the atmosphere produces at least part of the air-borne particle;
   in step (A), the refractory vessel comprises a glass melt stirring device comprising (a) a stir chamber defined by a chamber wall comprising a refractory metal and (b) a stirrer shaft comprising a refractory metal; and
   in step (B), the electric field is at least partly generated by an electrical potential gradient between (i) the stir chamber wall and the stirrer shaft, which together function as a first electrode subjected to the same electric potential; and (ii) an opposite second electrode placed above the surface of the glass melt.

2. A process according to claim 1, wherein the refractory metal vessel comprises platinum or an alloy thereof.

3. A process according to claim 1, wherein the electric field generates a corona in the atmosphere.

4. A process according to claim 1, wherein:
   in step (B), a barrier for receiving particles is provided between the opposite second electrode and the surface of the glass melt.

5. A process according to claim 1, wherein:
   in step (B), the electrical field between the first electrode and the second electrode is effected by an electric potential gradient of at least 100V.

6. A process according to claim 1, wherein:
   in step (B), the second electrode is provided with a higher electric potential than the first electrode.

7. A process according to claim 1, wherein:
   in step (A), the glass melt is suitable for making a glass substrate for LCD displays.

8. A process according to claim 1, wherein at least part of the wall of the stir chamber and at least part of the stir shaft are exposed to an oxygen-containing atmosphere.

* * * * *